United States Patent [19]
Goldstein et al.

[11] Patent Number: 5,320,382
[45] Date of Patent: Jun. 14, 1994

[54] PULSED PRESSURE SOURCE PARTICULARLY ADAPTED FOR VEHICLE OCCUPANT AIR BAG RESTRAINT SYSTEMS

[75] Inventors: Yeshayahu Shyke A. Goldstein, Gaithersburg, Md.; Melvin Widner, Rochester Hills, Mich.

[73] Assignee: GT-Devices, Alexandria, Va.

[21] Appl. No.: 789,577

[22] Filed: Nov. 8, 1991

Related U.S. Application Data

[63] Continuation-in-part of Ser. No. 708,268, May 31, 1991, abandoned.

[51] Int. Cl.$^5$ .............................................. B60R 21/26
[52] U.S. Cl. .................................. 280/735; 280/741; 422/166
[58] Field of Search ............... 280/728, 730, 731, 732, 280/736, 740, 741, 742, 734, 735, 737; 102/530, 531; 422/164, 165, 166

[56] References Cited

U.S. PATENT DOCUMENTS

| | | |
|---|---|---|
| 3,645,809 | 2/1972 | Stow, Jr. . |
| 3,658,607 | 4/1972 | Cook et al. . |
| 3,692,495 | 9/1972 | Schneiter et al. . |
| 3,724,870 | 4/1973 | Kurokawa et al. . |
| 3,767,228 | 10/1973 | Lewis . |
| 3,773,352 | 11/1973 | Radke . |
| 3,837,671 | 9/1974 | Hamilton . |
| 3,874,695 | 4/1975 | Abe et al. . |
| 3,887,819 | 6/1975 | Kurasawa . |
| 3,897,285 | 7/1975 | Hamilton et al. . |
| 3,966,228 | 6/1976 | Neuman . |
| 4,033,610 | 7/1977 | Shingu et al. . |
| 4,213,635 | 7/1980 | Inokuchi et al. . |
| 4,358,998 | 11/1982 | Schneiter ............... 102/530 |
| 4,696,705 | 9/1987 | Hamilton .............. 149/21 |
| 4,722,551 | 2/1988 | Adams ................. 280/736 |
| 4,929,290 | 5/1990 | Cartwright . |
| 4,950,458 | 8/1990 | Cunningham ............ 102/531 |
| 5,012,719 | 5/1991 | Goldstein et al. . |
| 5,060,973 | 10/1991 | Giovanetti . |
| 5,098,123 | 3/1992 | Jones ................. 280/741 |

FOREIGN PATENT DOCUMENTS

314898 5/1989 European Pat. Off. .

*Primary Examiner*—Karin L. Tyson
*Attorney, Agent, or Firm*—Lowe, Price, LeBlanc & Becker

[57] ABSTRACT

An occupant passive restraint system for an automotive vehicle comprises an air bag and a pulsed pressure source in fluid flow relation with the air bag. The pulsed pressure source includes plural pulsed pressure sources sequentially energized in response to the deceleration sensor sensing a single crash impact. Each source includes plural chambers holding progressively larger masses of gas generant. The chambers are arranged so that each has an outlet coupled with the chamber having the next largest gas generant mass. The gas generant mass in each chamber is predominantly a non-explosive solid particulate material. The smallest chamber includes a fuse in contact with the generant. When a crash is sensed the fuse is supplied with a pulse having sufficient energy and duration to rupture the fuse and form a plasma discharge in the generant in the smallest chamber. The plasma discharge has sufficient energy to ignite the generant in the smallest chamber to a vapor. Gas from each chamber sequentially flows into the chamber having the next largest gas generant mass to sequentially activate the generant mass in the next largest chamber. A temperature sensor controls energization of the pressure pulse to control when each pulse is derived and/or how many pulses are derived.

45 Claims, 6 Drawing Sheets

PULSED PRESSURE SOURCE PARTICULARLY ADAPTED FOR VEHICLE OCCUPANT AIR BAG RESTRAINT SYSTEMS

RELATION TO CO-PENDING APPLICATION

The present application is a continuation-in-part of the co-pending, commonly assigned application Ser. No. 07/708,268, filed May 31, 1991, entitled High Pressure Pulse Gas Source Particularly Adapted for Vehicle Occupant Air Bag Restraint Systems, now abandoned.

FIELD OF INVENTION

The present invention relates generally to pulsed pressure sources and, more particularly, to pulsed pressure sources particularly adapted to inflate air bags of automotive vehicle occupant air bag passive restraint systems

BACKGROUND ART

Vehicle occupant air bag restraint systems include an accelerometer or array of accelerometers for supplying signals to an electronic processing unit for deriving an output signal in response to a sensed vehicle deceleration associated with a crash. The electronic processing unit derives a crash indicating output signal that is supplied to a pulsed gas source. The pulsed gas source fills an air bag that is inflated in a vehicle occupant compartment against the body of an occupant, to hold the occupant in place during the deceleration forces associated with a vehicle crash The bag must be filled with approximately 100 liters of gas to a pressure of three to four atmospheres from the pulsed gas source in approximately 40 milliseconds. It is essential for the gas from the pulsed gas source to decrease quickly to approximately ambient level to enable the occupants of the vehicle to escape from the vehicle, if necessary. It is also necessary for the gas of the pulsed gas source to be non-toxic and non-combustible because (1) the gas in the bag ultimately vents into the vehicle occupant compartment on deflation and (2) the possibility of air bag failure during a crash or during inadvertent inflation in a non-crash situation. It is also necessary for a gas generating mass of the pulsed gas source to remain stable over long time durations and under fairly extreme operating temperature conditions of between $-45°$ C. and $70°$ C.

The first vehicle occupant air bag restraint systems used high pressure stored gas to inflate the air bag. While these systems adequately inflated the air bag in response to a crash condition being sensed, they had numerous disadvantages relating to weight, size, cost and reliability. An exemplary prior art vehicle occupant air bag restraint system of this type is disclosed in U.S. Pat. No. 3,837,671.

A second vehicle occupant air bag restraint system which is currently being extensively used is of the type disclosed in U.S. Pat. No. 4,929,290 wherein the high pressure gas pulse is derived from a solid propellant, usually sodium azide ($NaN_3$). The sodium azide is burned in response to burning of black powder which is ignited by a sufficient current being supplied to a fusible metal element embedded therein to cause the element to fuse and explode the propellant to generate the high pressure gas pulse. To prevent the partially-combusted materials from injuring vehicle occupants who are in the air bag path, a gas filter is located between the propellant and folded air bag, to pass gas from the pulse gas source, while blocking the flow of particulates.

Despite the wide use of this technique, the sodium azide propellant has numerous disadvantages. Sodium azide manufacture is hazardous because of a substantial risk of accidental fire and explosion, at least until the propellant is pelletized In addition, when sodium azide is ignited it can produce harmful by-products and is likely to produce partially-combusted materials that can burn through fabric of an air bag. Further deficiencies in the use of sodium azide as a propellant for deriving the high pressure gas pulse of a vehicle occupant air bag restraint system relate to size, weight, and cost. In addition, sodium azide is a carcinogen which can have possible detrimental effects on vehicle occupants and personnel who assemble the air bags.

Another high pressure pulsed gas source that has been proposed in vehicle occupant air bag restraint systems is disclosed in U.S. Pat. No. 3,966,266. In this system, there is a combination of a stored gas source and a combustible propellant. The propellant is ignited and the gas generated thereby is supplemented by the stored high pressure gas. This compromise system suffers, to a certain extent, from the deficiencies of the two previously mentioned systems.

It is, accordingly, an object of the present invention to provide a new and improved high pressure pulsed gas source and method of a type particularly adapted for use with vehicle occupant air bag restraint systems.

Another object of the invention is to provide a new and improved pulsed gas source and method having a programmed, controlled and predictable pressure versus time variation. A programmed pressure vs. time variation for an air bag is particularly advantageous because it enables the same basic structure to be used with different automotive vehicle models and for different occupant locations in the same vehicle. The passenger air bag is generally larger than the driver air bag because the passenger is much more likely to be in many different positions than the driver.

It is important in vehicle occupant air bag restraint systems for the gas supplied to a constant volume that is approximately twice the volume of a filled air bag to have a controlled pressure versus time variation to achieve proper air bag filling. It is preferable for the gas pressure versus time variation to have an increasing slope over a substantial portion of the gas pulse duration and for the slope not to decrease until shortly before the pulse terminates, i.e. as deflation of the air bag begins. Hence, during the early part of the inflation operation it is desirable to have a slow pressure increase (i.e. low slope), so that the occupant does not receive an initial possibly injurious high impact from the bag. This is particularly important for small occupants, e.g. children, or passenger seat occupants who are likely to be in many different positions at the time of a crash. As time progresses it is desirable for the slope of the pressure vs. time variation to increase to enable the occupant to be firmly secured in place to minimize injury.

It is also desirable in vehicle occupant air bag restraint systems for the gas pressure to be controlled as a function of temperature. If a crash occurs at low temperature, it is preferable to supply a greater number of gas molecules to the air bag over the gas pulse interval required to fill the air bag, as a result of the basic gas laws. Conversely, if a crash occurs at high temperature the air bag should be supplied with fewer gas molecules over the 40 millisecond interval. In the prior art, this desired result has not been possible.

In the prior art, at low temperatures, the bag generally is not fully inflated during the 40 millisecond interval because the number of propellant gas molecules has a tendency to remain the same at low temperature as at room temperature. In the opposite manner, at high temperature the bag becomes full within less than 40 milliseconds and has a tendency to exert excessive force against the occupant, with possible injury to the occupant.

It is, accordingly, still another object of the present invention to provide a new and improved pulsed gas source particularly adapted for use in vehicle occupant air bag restraint systems, wherein the pressure derived from the source supplied to a constant gas volume that is approximately twice the volume of a filled air bag has an increasing slope over a majority of the gas pulse duration.

An additional object of the invention is to provide a new and improved pulsed gas source and method particularly adapted for vehicle occupant restraint systems wherein the number of gas molecules supplied by the gas source changes inversely as a function of temperature.

It has also been proposed to activate an air bag by supplying a plasma to a relatively inert slurry of aluminum and water. The plasma is derived by supplying sufficient energy to a fuse wire to cause the wire to rupture and establish a plasma arc. However, because of the large amount of energy necessary to convert an aluminum water slurry to a high pressure vapor, such an air bag actuator is not practical for automotive vehicles having the typical 12-volt DC power supply including a battery and an alternator.

It is, accordingly, still another object of the present invention to provide a new and improved pulse source, particularly adapted to activate an automotive vehicle air bag in response to a plasma being supplied to a gas generant.

THE INVENTION

In accordance with one aspect of the invention a high pressure gas source for deriving a pulse of gas having a controlled high pressure versus time variation comprises a housing including a gas generating mass having a nongaseous state at ambient temperatures and an exit region for gas generated from the mass. Plural electric activating elements located at different positions in the mass are connected to an energizing electric source at different times in response to a detector sensing a single predetermined event, e.g. a single impact of an automobile crash. The elements and energizing electric source are arranged so that different ones of the elements vaporize different portions of the mass at different times to cause the portion of the gas generating mass proximate a particular element to be converted to high pressure gas that flows through the exit region. Each element is preferably a plasma source formed of a fuse that is ruptured in response to an electric pulse being supplied to it. Plasma from the source initiates vaporization of and formation of a plasma in a portion of the mass in contact with the fuse. The plasma spreads to and converts additional portions of the mass to a plasma that forms a portion of the high pressure gas of the source. Activation times of the electric elements and the positioning of the portions of the mass relative to each other and the exit region are such that the pressure pulses overlap in time and space to produce a resultant pressure pulse having a pressure vs. time variation having an increasing average slope over each time interval between adjacent activation times of the electric elements. The pressure variation is assumed to be into a constant enclosed volume at least twice the bag volume. Hence, the average slope of the pressure vs. time variation of the gas pulse into a constant enclosed volume equal to at least approximately twice the volume of the bag increases over fixed contiguous time intervals beginning at the start of the pulse and ending when the bag starts to deflate due to contact of the bag with the occupant.

Preferably, ambient temperature controls conversion of the mass to the high pressure gas so that the maximum pressure and duration of the pulse remain about the same despite temperature variations. In one embodiment this control is provided by changing the time when individual electric activating elements are energized as a direct function of temperature so that the time interval between energization of first and second electric activating elements is shorter for low temperatures than for high temperatures. In another embodiment, the number of gas molecules in a pressure pulse the gas source supplies to a load changes as an inverse function of ambient temperature.

Another aspect of the invention relates to a method of and apparatus for inflating an air bag of an occupant restraining system of a vehicle by supplying the bag with a pulse of gas with pressure sufficiently high to inflate the bag and restrain a passenger in response to a single impact of a crash of the vehicle wherein the pressure versus time variation of the gas pulse into a constant enclosed volume equal approximately to at least twice the volume of the bag has an average slope which increases over each time interval of the pulse until deflation begins.

The pulse is preferably formed by converting at different times a plurality of different portions of a gas generating mass into a high pressure gas that flows into the air bag. The mass includes 1, 2 . . . k . . . N portions each including an electric activating element.

The method includes sequentially converting the mass in portions 1, 2 . . . k . . . into gas during time intervals 1, 2 . . . k . . . . The conversion is performed by supplying sufficient current to electric fuses in portions 1, 2 . . . k . . . during time intervals 1, 2 . . . k . . . to cause sequential vaporization of the masses in portions 1, 2 . . . k . . . during intervals 1, 2 . . . k . . . into plasmas having sufficient pressure to inflate the air bag, where k is sequentially 1, 2 . . . ≦N.

In accordance with a further aspect of the present invention, a pulsed pressure source, particularly adapted for use as a single module of a multi-module automotive vehicle air bag inflator, comprises plural chambers holding progressively larger masses of gas generants. The chambers are arranged so that each has an outlet coupled in fluid flow relation with the chamber having the next largest gas generant mass. The gas generant mass in each chamber is predominantly a nonexplosive solid particulate material. The smallest chamber includes a metal element, in the nature of a fuse, that contacts the generant in the smallest chamber and is selectively connected to an electric source. The electric source supplies a pulse having sufficient energy and duration, when coupled to the element, to cause the element to burst and form a plasma discharge in the generant in the smallest chamber. The plasma discharge has sufficient energy and pressure to energize the generant in the smallest chamber to a vapor in response to the surface of the particles being heated by the plasma from the metal flowing between the particles. The chambers and generants are arranged so that gas from each chamber sequentially flows into the chamber having the next largest gas generant mass. Thereby, the generant mass in the next largest chamber is sequentially activated to a gaseous state.

In the preferred embodiment, the chambers, masses in the chambers and the flow paths between the chambers are arranged so that gas flow from chamber C1 into chamber C2 continues until after gas flow from chamber C2 to chamber C3 is initiated, where C1, C2 and C3 are chambers having progressively larger generant masses therein. Such an arrangement enables the pressure pulse from the largest chamber to be sustained in response to a relatively small amount of electric energy being supplied to the metal element of the smallest chamber. There is, in effect, a substantial energy gain as a result of the relationship of the gas flows between the chambers.

The pressure and temperature of the generant in each chamber $C_i$ are preferably approximately constant while the solid particulate generant in chamber $C_i$ is being consumed by the gas in chamber $C_i$, where $C_i$ is selectively each of the chambers. Because the pressure and temperature of the solid particulate generant in each chamber are approximately constant, at values in excess of those required to maintain the generant in a gaseous state, there is proper vapor formation in each chamber, as well as proper gas flow between chambers. To achieve the approximately constant pressure and temperature of the generant in a particular chamber while gas is being formed in the chamber, the mass flow rate of the gas from chamber $C_i$ to chamber $C_{i+1}$ is approximately equal to the consumption rate of the generant in chamber $C_i$, where $C_{i+1}$ is the chamber in fluid flow relation with chamber $C_i$. Chamber $C_i$ has a volume sufficiently small relative to that of chamber $C_{i+1}$ that there is virtually no fluid flow from chamber $C_{i+1}$ back to chamber $C_i$.

In the preferred embodiment, the gas generant is non-explosive ammonium nitrate ($NH_4NO_3$) particles, which may be coated with carbon powder in certain instances. To provide optimum burn and flow characteristics, the particles are approximately 200 micrometers in diameter and the carbon powder, if used on the particles, has a diameter of about 5 micrometers. Because of the hydroscopic properties of the ammonium nitrate particles, the particles are hermetically sealed. The use of $NH_4NO_3$ is particularly advantageous because its ease of handling during manufacture and installation reduces cost. In addition, the amount of solid residue particles in the high pressure reactant flowing from a source of the uncoated $NH_4NO_3$ particles is considerably reduced relative to the prior art. Thereby, very simple, inexpensive solid separating filters can be used between the pulsed pressure source and the air bag.

In the preferred embodiment, an electric source for energizing the metal element, i.e., fuse, includes a capacitor connected to be charged by a DC power supply. The capacitor is connected in a discharge circuit including the metal element in series with an inductor. Such a circuit enables a pulse having the desired amplitude and duration to be supplied to the metal element to establish a sufficiently high temperature to form the plasma in response to fusing of the metal element. To appreciate the energy gain attained with the present invention, 80 joules are coupled by the electric pulse source to three metal elements of three modules, each including three chambers; the three modules produce about 200 kilojoules of heat. The electric pulse supplied to each module has a duration less than an order of magnitude of the duration of the pressure derived from the chamber having the smallest generant mass therein.

To facilitate plasma formation, the metal fuse element has a segment with a smaller cross-sectional area than the remainder thereof. The smaller cross-sectional area segment is initially vaporized to form the plasma in response to the pulse being supplied to the fuse.

For the air bag activator application, plural modules, preferably of the described type, are sequentially activated in response to a crash being sensed (a sensed parameter) so that a pressure pulse from each module flows continuously to the air bag load over an interval beginning with flow from the chamber having the largest generant mass of the first activated module and ending with flow from the chamber having the largest generant mass of the last activated module. The various modules are arranged so that pressure from the first activated module does not decrease over the duration of the pressure pulses from the remaining modules, the pressure from the second activated module does not decrease over the duration of the pulse from remaining sources, etc. so that the pressure versus time response of the gas flowing from all of the activated modules to the common air bag load has an increasing or constant positive slope over the majority of its duration.

In accordance with a further aspect of the invention, a passive occupant restraint system for an automotive vehicle having a battery comprises an air bag, means for sensing deceleration of the vehicle associated with a crash and a pulsed pressure source in fluid flow relation with the air bag. The pulsed pressure source includes means for generating separate smaller pressure pulses at sequential time intervals in response to the deceleration means sensing a single impact of a crash. The sequentially generated smaller pulses are combined to produce a gas flow for inflating the air bag.

The above and still further objects, features and advantages of the present invention will become apparent upon consideration of the following detailed description of several specific embodiments thereof, especially when taken in conjunction with the accompanying drawings.

DESCRIPTION OF THE PREFERRED EMBODIMENT

Figure 1:
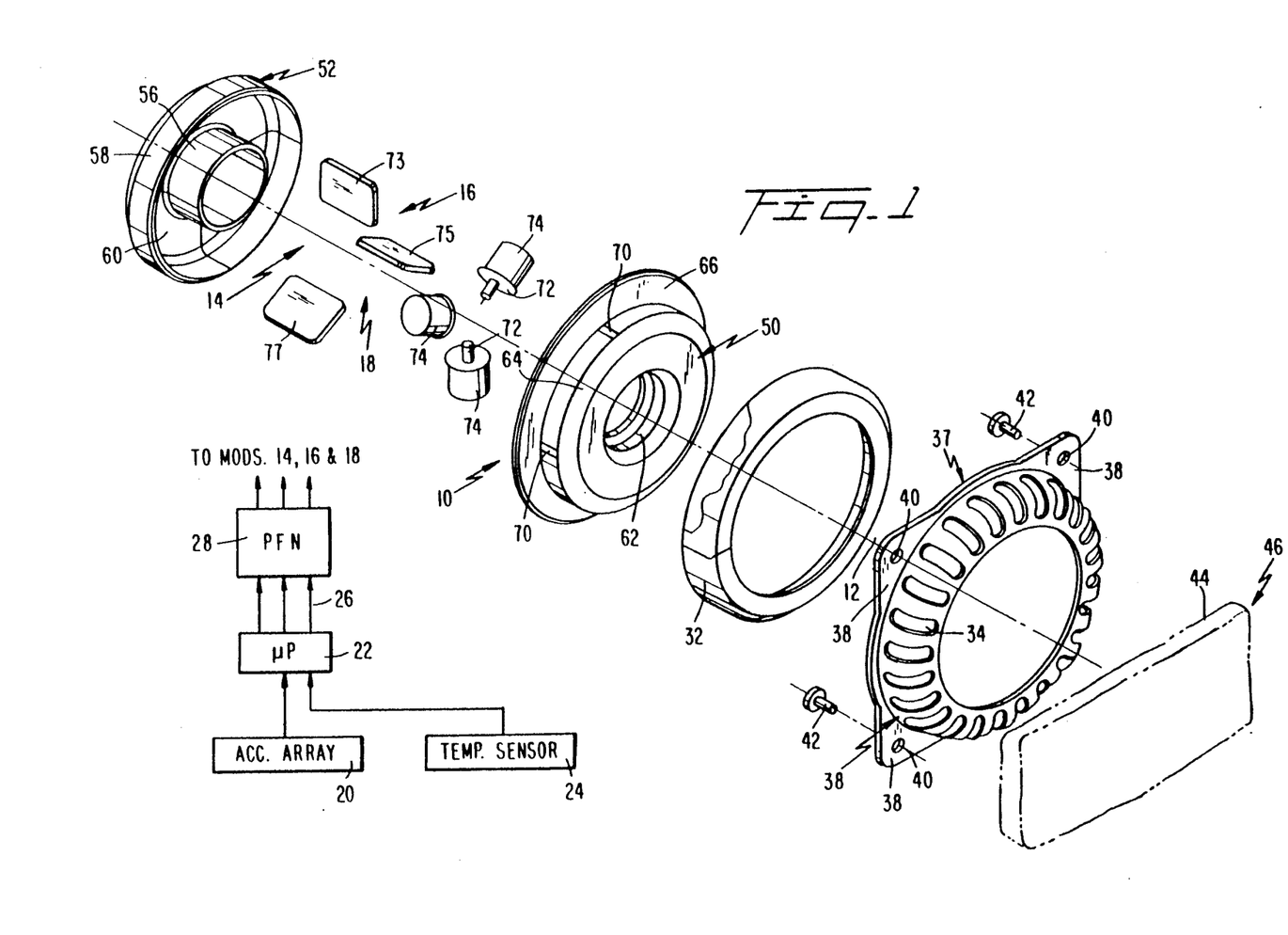
FIG. 1 is a combined exploded view and electrical block diagram of an air bag inflator in accordance with a preferred embodiment of the invention.
Figure 2:
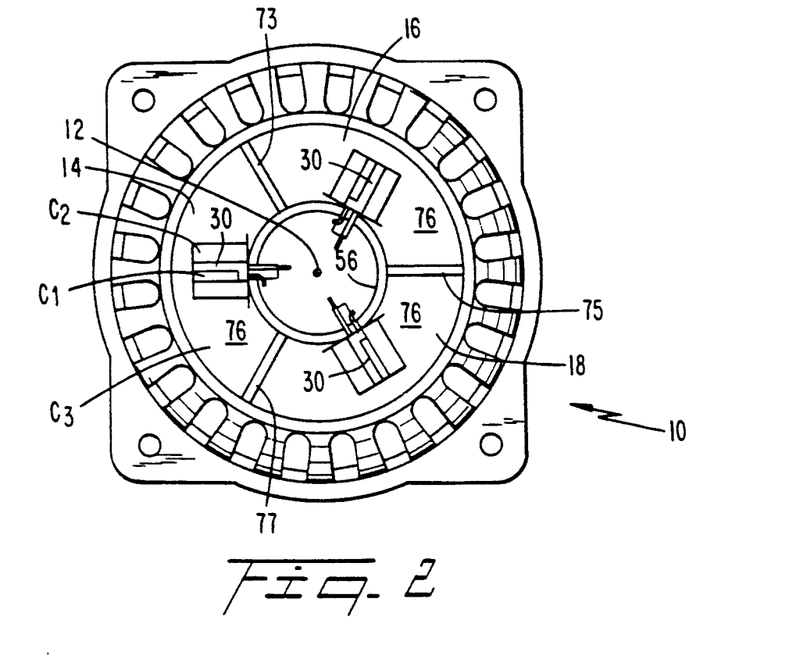
FIG. 2 is an end view of the air bag inflator illustrated in FIG. 1.
Figure 3:
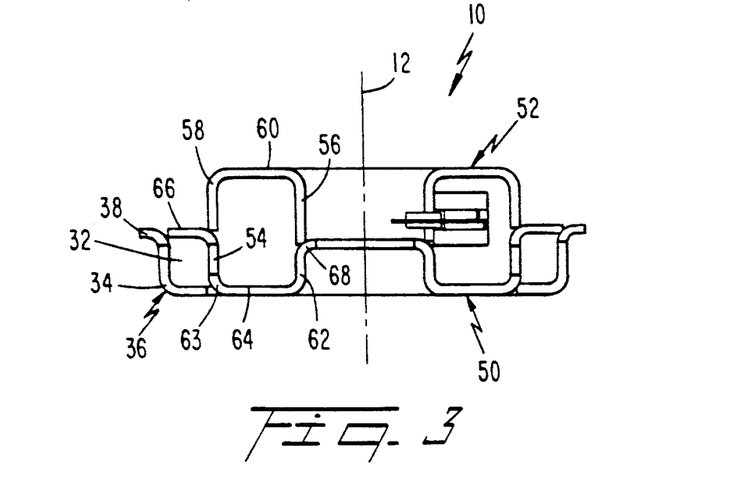
FIG. 3 is a cross sectional view of the structure illustrated in FIG. 2.

Reference is now made to FIGS. 1–3 of the drawing wherein automotive vehicle air bag inflator 10 is illustrated as including longitudinal axis 12, about which are equi-angularly spaced modules 14, 16 and 18. Modules 14, 16 and 18 sequentially derive pulses of relatively high pressure gas in response to an accelerometer or array of accelerometers 20 supplying signals to microprocessor 22 indicative of the automotive vehicle being in a crash. Microprocessor 22 responds to signals from array 20 associated with a single impact of an automotive vehicle crash and temperature sensor 24 to supply sequential signals to leads 26, which in turn control pulse forming network 28. Network 28 supplies pulses to ignitors 30, one of which is included in each of modules 14, 16 and 18. Ignitors 30, generally in the form of electric fuses, are activated sequentially with time separations determined by the vehicle passenger compartment ambient temperature detected by sensor 24 to control the flow of gas from modules 14, 16 and 18 through an exit region comprising filter 32 and slots 34 in manifold 36.

Manifold 36 includes flange or base plate 37 having four coplanar outwardly extending ears 38, each including a threaded hole 40. Bolts 42 are threaded into holes 40 to engage end plate 44 of air bag housing 46 and securely hold the air bag housing to manifold 36.

Filter 32, manifold 36 and housing 46 are coaxial with axis 12 and dimensioned so that they are basically nested with each other, with the annular filter having outer side and end walls abutting against corresponding inner walls of the annular manifold, in turn having outer walls abutting against inner walls of housing 46.

Modules 14, 16 and 18 fit in an annular region between inner and outer walls of front and rear covers 50 and 52, that are coaxial with axis 12 and fixedly connected with each other. Filter 32 fits between manifold 36 and front cover 50. Covers 50 and 52 are arranged so that gas produced by modules 14, 16 and 18 flows radially away from axis 12 through gaps 54 in side wall 63 of front cover 50, thence through filter 32 and slots 34 to the air bag in housing 46.

To these ends, rear cover 52 includes longitudinally extending cylindrical, ring-like side walls 56 and 58, connected together by end wall 60. Front cover 50 includes ring-like coaxial longitudinally extending cylindrical walls 62 and 63, connected together by annular end wall 64. Wall 63 is connected to flange 66 by struts 70 that extend across slot 54. Walls 56 and 62 are aligned as are walls 58 and 63. Front cover 50 is fixedly secured to rear cover 52 by the free end of wall 56 being bonded to flange 66 that extends radially from wall 62 and by a bond between the free end of wall 58 and end wall, i.e., flange 56. Manifold 36 is secured to front cover 50 by bonds that subsist between the tip of flange 66 and flange 38 and between the inner edge of the manifold and an intersection between front cover walls 63 and 64.

Each of modules 14, 16 and 18 extends between a pair of radially extending separator plates 73, 75 and 77 in the volume defined by the interior faces of walls 56, 58, 60, 62, 63 and 64. In a preferred embodiment, each of modules 14, 16 and 18 has an angular extent of approximately 120°. In other embodiments, however, different modules may have different volumes as a result of separator plates 73, 75 and 77 being angularly spaced from each other by angles other than 120°. While it is desirable for three modules to be provided for economic reasons, for more precise control of the pressure vs. time variation it may be desirable to have four or more modules, in which case more than three separator plates are employed.

Figure 4:
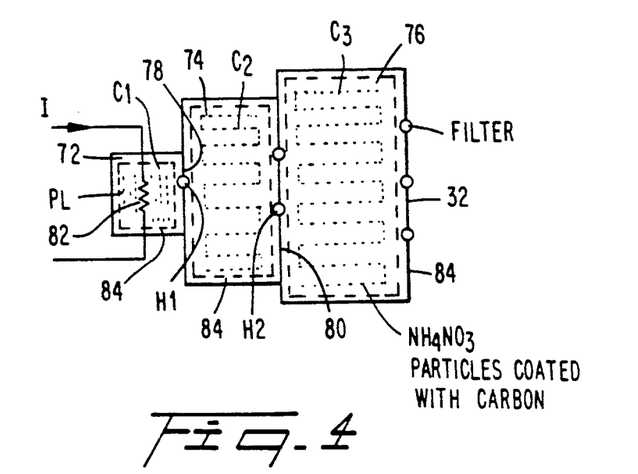
FIG. 4 is a mechanical schematic diagram of a single pulsed pressure module source of the type included in the device illustrated in FIGS. 1-3.

As schematically illustrated in FIG. 4, each of modules 14, 16 and 18 includes ignition chamber 72, boost chamber 74 and main chamber 76. Each of chambers 72, 74 and 76 includes a non-explosive, small particle gas generant, preferably ammonium nitrate ($NH_4NO_3$), that is in certain instances coated with carbon powder. Since ammonium nitrate is hygroscopic, the ammonium nitrate particles loaded into chambers 72, 74 and 76 are hermetically sealed by being packed into water impervious bags 84.

The gas generant particles in chambers 72 and 74 are separated from each other by metal, frangible diaphragm 78, the particles in chambers 74 and 76 are separated from each other by metal, frangible diaphragm 80, and the particles in chamber 76 are separated from slots 34 of manifold 36 by filter 32. Diaphragms 78 and 80 and filter 32 are arranged so that the mass flow of fluid through diaphragm 78 is approximately equal to the consumption rate of generant in chamber 72, the mass flow rate through diaphragm 80 is approximately equal to the consumption rate of generant in chamber 74 and the mass flow rate through filter 32 is approximately equal to the consumption rate of generant in chamber 76. To these ends, the pressure and temperature of plasma produced in each of chambers 72, 74 and 76 remain approximately constant while generant in the respective chamber is burning. These results are achieved by appropriately selecting the volumes of chambers 72, 74 and 76 and the masses of the generants therein by providing vent holes H1 and H2 of the correct area in diaphragms 78 and 80 and by proper selection of the porosity of filter 32. The volume and generants in chambers 72, 74 and 76 are such that there is a positive flow of plasma gas from chamber 72 into chamber 74 until bursting of diaphragm 80. The volumes of chambers 72 and 74 are also respectively small enough relative to the volumes of chambers 74 and 76 that there is no substantial backflow into chambers 72 and 74 from the successively larger volume chambers 74 and 76. To these ends, in one preferred embodiment, the volumes of chambers 72, 74 and 76 are respectively approximately 0.05 cubic centimeter, 0.8 cubic centimeter and 12 cubic centimeters.

To initiate a plasma in chamber 72, metal fusible wire 82 is embedded in the generant particles located in chamber 72. Sufficient energy is supplied to fusible element 82 to cause it to rupture and ignite to produce an arc that forms a plasma in the particles in chamber 72. The plasma, initially mostly vapor of the metal in element 82, is sustained by high power from a pulse-forming network including an inductor and capacitor, described in detail infra. The plasma produced by ignition of metal element 82 has a relatively high temperature, e.g. 4000° K. The high temperature plasma expands into the remaining generant particles in ignition chamber 72.

The surfaces of the particles in chamber 72 heat rapidly as the plasma from element 82 flows between them. When the surface temperature of the particles reaches the ignition temperature of the $NH_2NO_3$, the $NH_4NO_3$ dissociates to release $O_2$ that burns the carbon powder to impart additional heat to the ammonium nitrate. The ammonium nitrate particles continue to burn, causing additional gas to be generated in chamber 72. The resulting increased gas pressure in chamber 72 reaches a peak at which the gas generation rate in chamber 72 equals the gas mass flow rate through vent holes in diaphragm 78. Diaphragm 78 and the vent holes H1 therein are designed so that a pressure of about 1000 psi is maintained in chamber 72 even though gas is supplied by chamber 72 to the larger volume of chamber 74.

The 1000 psi pressure is maintained in chamber 72 even after the initial sudden increase in pressure resulting from formation of the plasma by rupture of fuse element 82. Diaphragm 78 confines the pressure of the plasma initially to chamber 72 and for several milliseconds thereafter. Without the flow impedance of diaphragm 78 at the time fuse 82 ruptures to form the plasma, i.e., if a direct flow path were initially provided from chamber 72 to chamber 74, the plasma pressure from rupture of element 82 would be dissipated in microseconds so the particles in chamber 72 would not be heated to combustion. The pressure in chamber 72 becomes sufficiently high to rupture diaphragm 78 to provide a low impedance flow path from chamber 72 to chamber 74.

The hot gases flowing into boost chamber 74 from ignition chamber 72 provide sustained heating of the particles in chamber 74 until the particles in the boost chamber ignite. The pressure in chamber 74 forces open vent holes H2 in diaphragm 80 and ultimately rupture of the diaphragm, causing gas to flow into chamber 76 and ignition of the generant particles in the main propellant chamber. Diaphragm 80 and vent holes H2 therein and the porosity of filter 32 are such that the particulates in chambers 74 and 76 are heated for relatively long time intervals to combustion. Hence, in each of chambers 72, 74 and 76 there is a sudden pressure increase followed by an increasing pressure with a gradually increasing slope. The increasing pressure is sustained through filter 32 for the remainder of the air bag filling time. The pressure vs. time variation of the gas flowing through filter 32 can be represented as a parabola having an apex (zero slope) at the end of the bag filling time, which occurs when the bag contacts the occupant. The gas generant mass and volume of chambers 72, 74 and 76 are preferably such that the generant weight and volume in each succeeding chamber are approximately 16 times larger than the previous chamber.

The ammonium nitrate in chambers 72, 74 and 76, when heated to ignition, dissociates to provide heat, nitrogen, water and oxygen and a very small amount of nitric oxide (NO). The exothermic reaction produces 2.5 kilojoules of heat for each gram of ammonium nitrate. The dissociation of ammonium nitrate is basically in accordance with:

The exothermic reactions in modules 14, 16 and 18, together having a volume of approximately 80 cubic centimeters and a weight of 80 grams of ammonium nitrate, produce approximately 200 kilojoules of gas flow energy from the approximately 80 joules of electric energy imparted to fuses 82 of the three modules. Energization of the generants in modules 14, 16 and 18 is typically over an interval of 40 milliseconds, to provide the desired pressure pulse to the air bag in housing 46. The use of ammonium nitrate is advantageous because this material is easily handled, being insensitive to shocks and friction. In addition, it is an inexpensive, nontoxic, non-explosive material that is easily stored and transported at low cost. Ammonium nitrate is easily disposed of since it can be mixed with water to form a fertilizer.

Preferably, the ammonium nitrate particles in modules 14, 16 and 18 have a diameter of approximately 200 micrometers. Particles of ammonium nitrate having a 200 micrometer diameter burn to one-third of the original diameter thereof in approximately eight milliseconds, at a pressure of 200 atmospheres. The total burn time of such particles in chambers 72, 74 and 76 is approximately 17 milliseconds.

If sufficient temperature to sustain the plasma cannot be obtained in the required time interval through the use of ammonium nitrate alone, the 200 micrometer ammonium nitrate particles are coated with carbon powder having a diameter of approximately 5 micrometers. This more highly energetic arrangement is likely to produce excessive heat, so that inert material, such as sand ($SiO_2$), is added. In response to the heat energy from the plasma, the ammonium nitrate carbon coated particles react to produce 4.8 kilojoules of heat for each gram of generant. The chemical reaction is:

The inert material in the generant does not burn, so that a fine filter must be provided at the outlet of each of modules 14, 16 and 18 to prevent the inert particles from filling the air bag.

The reactants of both previously mentioned chemical equations are basically nitrogen, steam, and, in the second reaction, carbon dioxide. All of these reactants have no adverse effects on vehicle passengers, being some of the most common gases in the atmosphere.

The $NH_4NO_3$ particles must be heated to combustion (a temperature greater than 320° C.) by the plasma from metal element 82. The large surface area, A, of the particles in chamber 72 is quickly translated into a relatively large amount of radiation power, i.e., $\sigma T^4 A$ watts, about 20,000 watts/cm$^2$. This radiation power is derived from an electric source during about 100 microseconds and supplied to a particle surface area of about 4 cm$^2$, whereby the electric power supply requirements of a module are about 10 Joules, as can be obtained from relatively inexpensive small capacitors.

Figure 5:
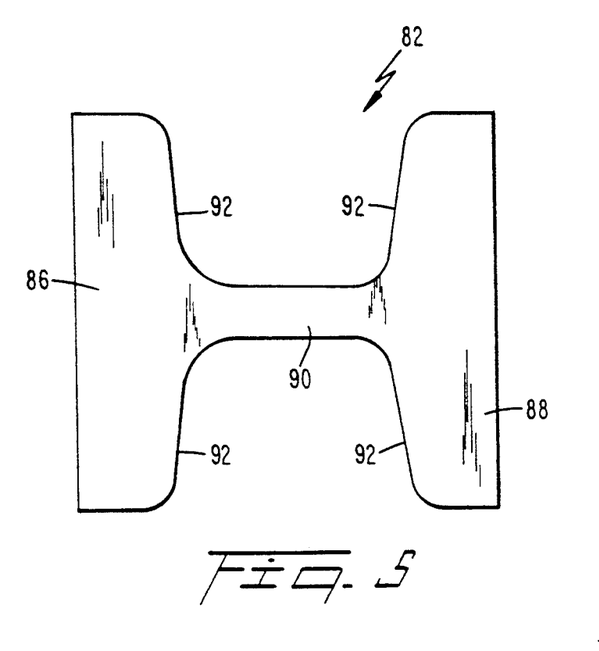
FIG. 5 is a top view of a plasma igniting fuse used in the structure illustrated in FIGS. 1-3.

In the preferred embodiment, as illustrated in FIG. 5, metal element or fuse 82 is a foil, typically having a thickness of about 12 micrometers. Fuse 82 includes enlarged end portions 86 and 88, between which subsists an elongated relatively narrow central portion 90. End portions 86 and 88 neck down to narrow portion 90 by way of continuously curved, tapered edges 92. In a preferred embodiment, the fuse has a length and total width of about 25 millimeters. Narrow portion 90 has a width of about 2.5 millimeters and a length of about 10 millimeters.

In response to the current density in narrow portion 90 exceeding a predetermined value, the narrow portion ruptures and the metal therein becomes a plasma. During the transition time of portion 90 from a metal to a plasma, the voltage across the fuse increases by two orders of magnitude, typically from about 1 to 2 volts, to approximately 360 volts, to produce a short duration (i.e. about 100 microseconds) electric pulse and a high power plasma flux that expands from fuse 82. Fuse 82 is connected to a pulse-forming network including an inductor and capacitor, designed to take advantage of this voltage escalation so that most of the electrical energy is delivered to the plasma in about 100 microseconds. Typically, an electric power supply feeds about 16–20 joules to fuse 82 during this interval, as a result of a current of approximately 900 amperes flowing between end portions 86 and 88 of the fuse. The high voltage is sustained by the inductor of the pulse-forming network.

There is very little ohmic heat dissipation during the rise time of the pulse but considerable ohmic heat dissipation at the time plasma is formed between end portions 86 and 88 immediately after rupture of narrow portion 90. While the plasma is generated between end portions 86 and 88, energy from the plasma is radiated and conducted to the generant particles in chamber 72 contacting narrow portion 90. The electric pulse and fuse configuration cause the plasma to become hot quickly so the contacting particles are heated rapidly, causing the surface temperature thereof to exceed 320° C., the temperature needed for ignition and decomposition of the generant. If the plasma were generated over a long time interval (e.g., several milliseconds), the heat would penetrate deep into the particles, resulting in a large mass being heated to a low temperature instead of the desired result of rapid heating to a high temperature.

Ignition of the generant in chambers 72, 74 and 76 is sequential. Plasma generation occurs approximately 0.7 millisecond after an electric pulse is supplied by the pulse-forming network to fuse 82. The propellant in chamber 72 ignites approximately 0.4 millisecond after fuse 82 converts the current supplied to it to a plasma. During the first 0.4 millisecond after ignition of the generant in chamber 72, about 10 Joules are radiated from the plasma. The particle surface temperature is approximately 600° C. under these circumstances, considerably in excess of the 320° C. temperature needed for ignition.

The generant, i.e. propellant, in chamber 72 continues to burn, and flows from chamber 72 into chamber 74, causing ignition of the generant in chamber 74 approximately 4 milliseconds after initial heating thereof by the burning particles flowing through diaphragm 80. The interval between application of the plasma to the particles in chamber 74 to ignition thereof is greater than the corresponding interval for the particles in chamber 72 because of the larger volume and lower temperature gases in chamber 74. Turbulent heat conduction heats the generant in chamber 74 at a power density of about 1,000 watts per square centimeter. The generant in chamber 76 is ignited by the hot gases from chamber 74 approximately 4 milliseconds after the gases from chamber 74 have begun to flow into chamber 76, i.e., approximately 9 milliseconds after power is initially applied to fuse 82.

There is initially virtually a step function increase in the pressure of the gases flowing from chamber 76 of each of modules 14, 16 and 18 into the air bag in housing 46. Thereafter, the pressure supplied by each module increases linearly, with a relatively low slope. The pressure increase derived from each of modules 14, 16 and 18 is sustained for a different time interval, with all of the pressure pulses beginning at different times and ending at about the same time. For example, the increase in pressure from module 14 is sustained over approximately a 40-millisecond interval, the pulse from module 16 respectively begins and ends about 12 and 40 milliseconds after the pressure pulse from module 14 begins and the pressure pulse from module 18 respectively begins and ends approximately 24 and 40 milliseconds after the pulse from module 18 begins.

Several different arrangements can be used to enable the different modules to produce pressure pulses having different durations. In one arrangement, the diameters of the ammonium nitrate particles in chambers 14, 16 and 18 are successively smaller, such that the largest diameter particles are in chamber 14. In another arrangement, the volumes of generant in chambers 14, 16 and 18 are successively smaller, such that separator plates 73 and 77 are farther from each other than are any of the other adjacent separator plates. Alternatively, successively larger amounts of inert material can be loaded into chambers 76 of modules 14, 16 and 18 so that the least amount of inert material is in chamber 76 of module 14.

The ignition times for the gas generants in modules 16 and 18 are preferably controlled in response to the ambient temperature detected by temperature sensor 24 in the passenger compartment. As the temperature detected by sensor 24 decreases, there is a decrease in the ignition times for fuses 82 in modules 16 and 18 relative to the ignition time of the fuse in module 14. Conversely, for high temperatures detected by sensor 24, the relative time spacing between activation of fuses 82 in modules 16 and 18 increases relative to the ignition time of the fuse in module 14. Control of the ignition times of the fuses in modules 16 and 18 is controlled by microprocessor 22 in response to the temperature detected by sensor 24, when a deceleration condition associated with a single impact of an automotive vehicle crash is sensed by the microprocessor in response to the output of accelerator array 20.

Figure 6:
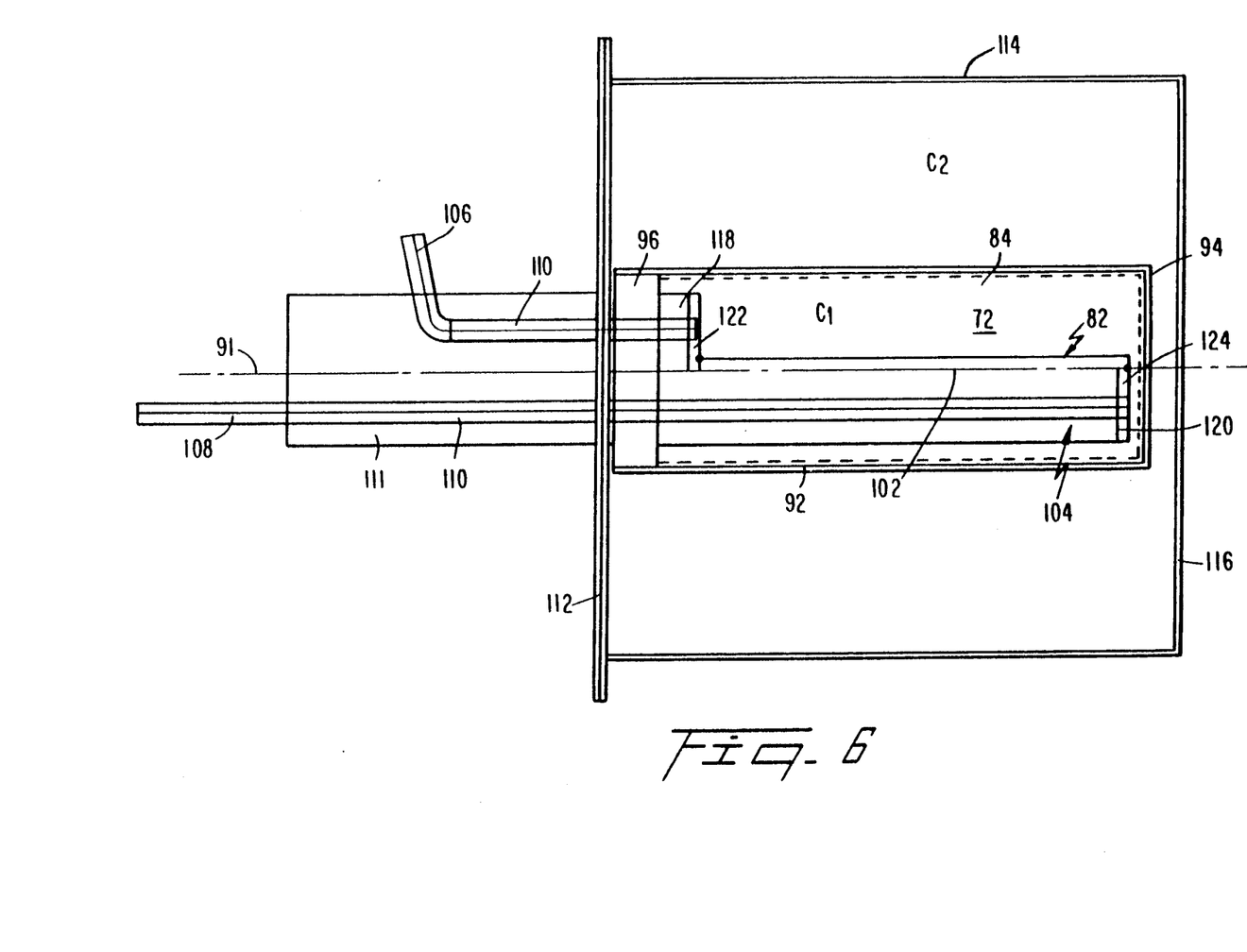
FIG. 6 is a side view of ignition and boost chambers of a single module used in the structure of FIGS. 1-3.
Figure 7:
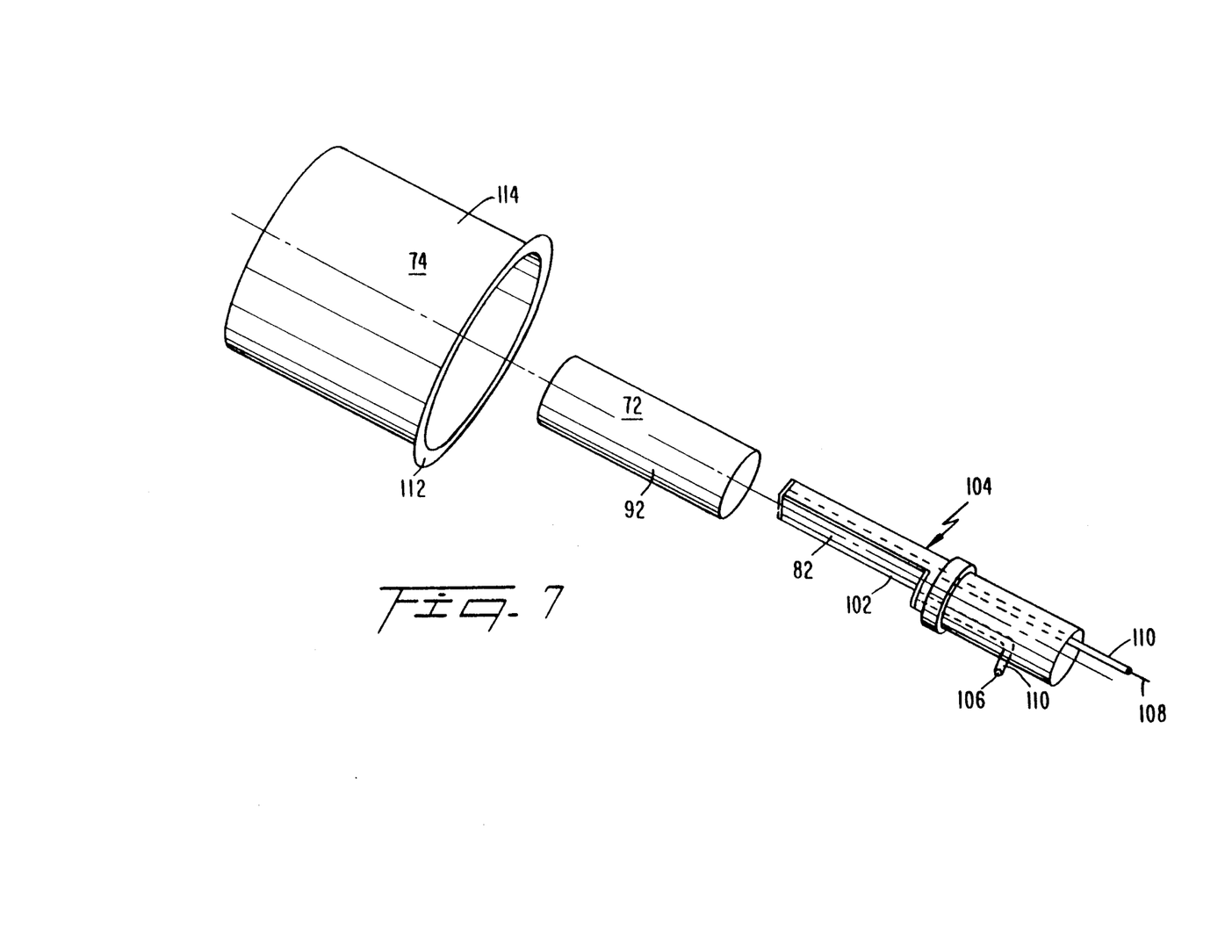
FIG. 7 is an exploded view of the structure illustrated in FIG. 6.

Reference is now made to FIGS. 5, 6 and 7 wherein details of chambers 72 and 74 and fuse 82 are illustrated. Chambers 72 and 74 are coaxial cylinders, having a common longitudinal axis 91. Chamber 72 includes cylindrical metal side wall 92, metal end wall 94 and dielectric base plate 96, to which the end of side wall 92 opposite end wall 94 is bonded. Diaphragm 78, with appropriate vent holes, is basically formed by walls 92 and 94.

Fuse 82 (shown as having greatly exaggerated thickness in FIG. 5) is positioned so that narrow portion, i.e. neck, 90 thereof extends along longitudinal axis 91. To this end, fuse 82 is mounted on flat face 102 of dielectric cylinder 104, having a longitudinal axis coincident with axis 91. Cylinder 104 extends through base plate 96 and carries wire leads 106 and 108, each of which is surrounded by a dielectric sheath 110. Wire leads 106 and 108 extend from end 111 of cylinder 104 that protrudes outwardly through and from metal end face 112 of chamber 74. Cylinder 104 and wire leads 106 and 108 of modules 14, 16 and 18 are positioned so that the wire leads extend from ends 111 of the cylinders radially toward axis 12, thence through the space surrounded by wall 56 of front cover 52 to pulse forming network 28.

Chamber 74 includes metal cylindrical side wall 114 and metal end face 116, opposite from metal end face 112. Walls 114 and 116 form diaphragm 80, having suitable vent holes for enabling plasma to flow from chamber 74 into main combustion chamber 76. Cylinder 104 includes semicircular end faces 118 and 120, disposed at opposite ends of flat segment 102. Fixedly mounted on end faces 118 and 120 are metal plates 122 and 124, mechanically and electrically connected to wires 106 and 108, as well as to end portions 86 and 88 of fuse 82. Thus, a current path is provided from terminals of pulse forming network 28, through wires 106 and plates 122 and 124 to fuse 82.

Figure 8:
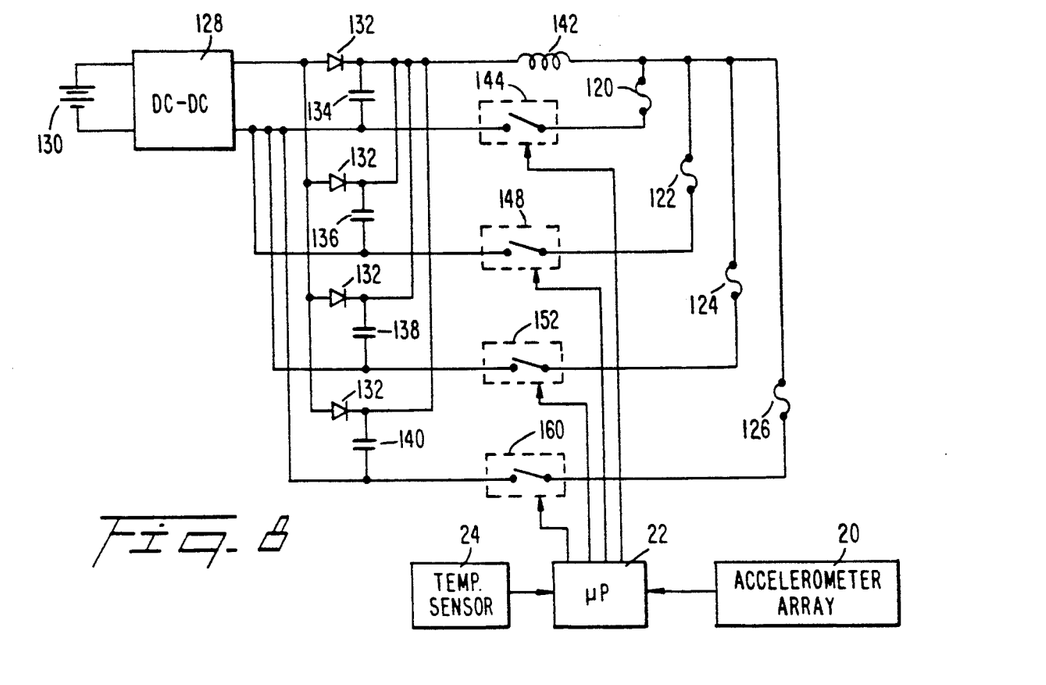
FIG. 8 is an electrical schematic diagram of another embodiment of the invention.

Reference is now made to FIG. 8, a schematic diagram of electrical apparatus included in an air bag inflator embodiment of the invention including four modules, only three of which are normally activated. The four modules respectively include fuses 120, 122, 124 and 126 (each corresponding with fuse 82) sequentially supplied with current when a single impact of a crash occurs, at times determined, inter alia, by the temperature detected by sensor 24. For ambient and high temperature situations, current is supplied to only fuses 120, 122 and 124. Current is supplied to fuse 126 only if the sensed passenger compartment temperature is less than 0° C. to enable the number of gas molecules flowing from the four modules to be somewhat inversely related to ambient temperature. Alternatively only three fuses are provided and the time between activation thereof is controlled by temperature sensor 24.

Pulse-forming network 28 which responds to timing pulses from microprocessor 22 to supply current to fuses 120–126 includes DC to DC converter 128 which increases the 12-volt output of automotive vehicle battery 130 to approximately 200 volts DC. The DC output of converter 128 is supplied in parallel via blocking diodes 132 to capacitors 134, 136, 138 and 140, typically having values of 1000 microfarads. Capacitors 134, 136, 138 and 140 are connected in parallel with each other when charged by converter 128. Capacitors 134, 136, 138 and 140 are connected in series with inductor 142 (typically having a value of 40 microhenries) when switches 144, 148, 152 and 160 are respectively closed. Contacts of switch 144 are permanently closed immediately after microprocessor 22 derives a pulse as a result of a single impact of an automotive crash having occurred, at time $t_0$. Between 3.5 and 4 milliseconds after closure of switch 144, the charge stored in capacitor 134 is transferred to inductor 142 and fuse 120. The current through fuse 120 quickly reaches a level, approximately 275 amperes, sufficient to rupture the fuse. The voltage across fuse 120 thereby increases from a level of 1 to 2 volts to approximately 360 volts, a level that is sustained for somewhat in excess of 500 microseconds. During the approximately 500-microsecond interval while the voltage across fuse 120 is maintained at approximately 360 volts, the current through the fuse decreases in a generally linear manner, virtually to zero, at which time the pulse voltage decreases drastically.

Rupture of fuse 120 results in generation of a plasma having a temperature of approximately 4000° K., i.e., approximately 0.4 electron volts. This temperature initiates burning of generant in chamber 72 containing fuse 120 and sequential burning of generants in chambers 74 and 76 so that the pressure and the slope of the pressure vs. time variation of the resulting gas flowing from chamber 76 into a constant volume equal to twice the volume of the bag being inflated increase suddenly at time $t_1$ (about 5 milliseconds after $t_0$); the pressure increase (from $t_1$ to $t_{1.8}$, about 12 ms. after $t_1$) is from atmospheric to approximately 1000 psi as indicated by waveform 146 (FIG. 9); the sudden increase in pressure vs. time occurs until $t_{1.8}$, about 12 ms. after $t_1$. After $t_{1.8}$ the pressure vs. time variation at the outlet of chamber 76 of the module associated with fuse 120 continues to increase as a parabola having decreasing slope as the particles in chamber 76 continue to burn to time $t_d$, approximately 40 milliseconds after $t_1$. At time $t_d$, when the apex of the parabola occurs, the air bag is fully inflated and there is no further increase in pressure supplied to the bag. Holes in the back of the bag become fully open at time $t_d$ which occurs simultaneously with full impact of the front of the bag with the occupant. The force imparted to the bag by the occupant causes a substantial flow of gas through the holes in the bag and a sudden decrease in the pressure exerted by the bag on the occupant.

Figure 9:
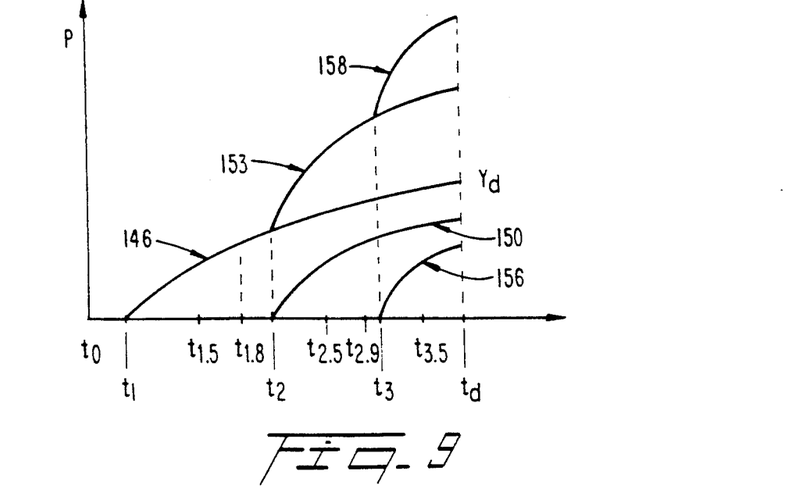
FIG. 9 includes a series of waveforms helpful in describing the operation of the device.

A few milliseconds after $t_{1.8}$, switch 148, connected in series with capacitor 136 and inductor 142, is permanently closed by an output of microprocessor 20. Closure of switch 148 causes current to flow in a similar manner from capacitor 136 through inductor 142 and fuse 122. The closure time of switch 148 is controlled by microprocessor 22 in response to the temperature detected by sensor 24. In response to the current flowing from capacitor 136 through inductor 142 and fuse 122, pressure versus time waveform 150, FIG. 9, is derived. Waveform 150 has a shape similar to waveform 146, but has a starting time at $t_2$, a few milliseconds after time $t_{1.8}$. Waveform 150 has an apex at $t_d$. The pressures from waveforms 146 and 150 are combined, to produce waveform segment 152, equal to the sum of waveforms 146 and 150 during the period which subsists until switch 152 is closed at time $t_3$ that occurs slightly after the transition at time $t_{2.9}$ of waveform 150 from an increasing positive slope to a decreasing positive slope.

Closure of switch 152 results in a current pulse being supplied by capacitor 138 and inductor 142 to fuse 124. In response to the current flowing through fuse 124, the module associated therewith derives the pressure pulse of waveform 156 that begins at time $t_3$ and has an apex at $t_d$. The pressure indicated by waveform 156 is combined with the pressures of waveforms 146 and 153 to produce waveform segment 158, equal to the sum of the pressures of waveforms 146, 150 and 156.

The slope of each of waveforms 146, 150 and 156 can be represented as $$\frac{dp(t)}{dt} = CR_0^2 \left(1 - \frac{t - t_s}{t_d - t_s}\right) \tag{1}$$

where:
p(t) is the pressure vs. time variation of the waveform,
t is time,
C is a constant,
$R_0$ is the initial diameter of particles in the chambers 72, 74 and 76 of the modules 14, 16 and 18 associated with the waveform,
$t_s$ is the ignition time of fuse 82 of each of modules 14, 16 and 18 so that $t_s$ is selectively each of $t_1$, $t_2$ and $t_3$, and
$t_d$ has been defined previously.

From Eq. (1) it can be shown that for each of waveforms 146 150 and 156

$$p(t) = \frac{dR_0^2}{2} \left(1 - \frac{t - t_s}{t_d - t_s}\right)^2 - Pdn \tag{2}$$

where
d is a constant, and

Pdn is the pressure value of each of waveforms 146, 150 and 156 at $t = t_d$.

Waveforms 146, 150 and 156 can thus be respectively represented as:

$$p_1(t) = \frac{d_1 R_{01}^2}{2}\left(1 - \frac{t - t_1}{t_d - t_1}\right)^2 - P_{d1} \tag{3}$$

$$p_2(t) = \frac{d_2 R_{02}^2}{2}\left(1 - \frac{t - t_2}{t_d - t_2}\right)^2 - P_{d2} \tag{4}$$

$$p_3(t) = \frac{d_3 R_{03}^2}{2}\left(1 - \frac{t - t_3}{t_d - t_3}\right)^2 - P_{d3} \tag{5}$$

where $d_1$, $d_2$ and $d_3$ are constants respectively associated with waveforms 146, 150 and 156, $t_1$, $t_2$ and $t_3$ are respectively the starting times of waveforms 146, 150 and 156, $R_{01}$, $R_{02}$ and $R_{03}$ are respectively the initial radii of particles in modules 14, 16 and 18, $P_{d1}$, $P_{d2}$ and $P_{d3}$ are respectively the pressures associated with waveforms 146, 150 and 156 at time $t_d$. During interval $t_1 \leq t < t_2$ the pressure applied to a fixed volume equal to twice the filled air bag volume is represented by $p_1(t)$; during interval $t_2 \leq t < t_3$ the pressure is $p_1(t) + p_2(t)$; and during interval $t_3 \leq t \leq t_d$ the pressure is $p_1(t) + p_2(t) + p_3(t)$.

In the example illustrated in FIG. 9, it is assumed that the temperature detected by sensor 24 is sufficiently high that microprocessor 22 does not supply a pulse to switch 160, connected in circuit with capacitor 140, inductor 142 and fuse 126. However, if the temperature detected by sensor 24 were sufficiently low e.g, 0° C. or less, microprocessor 22 would have supplied a pulse to switch 160 and an operation similar to that described for fuses 120, 122 and 124 would have caused energization of fuse 126 and additional gas molecules to be supplied to the air bag in housing 46. The maximum pressure, however, under these circumstances would have been somewhat the same as the maximum pressure for the situation illustrated in FIG. 9 because of the basic gas law.

The sum of the pressure pulses of waveforms 146, 150 and 156, FIG. 9, results in a composite waveform wherein the slope of the pressure versus time curve includes substantial portions that increase. The slope never decreases until the end of the pulse, at $t_d$. As discussed supra the increasing slope relationship is desired for effective operation of the air bag in housing 46. The average value of the slope of the composite waveform over each of the contiguous intervals $(t_0 - t_{1.5})$, $(t_{1.5} - t_{2.5})$, $(t_{2.5} - t_d)$ increases during each of these intervals so that the average slope during interval $(t_0 - t_{1.5})$ is less than the average slope during interval $(t_{1.5} - t_{2.5})$ and the average slope during interval $(t_{1.5} - t_{2.5})$ is less than the average slope during interval $(t_{2.5} - t_0)$ where $(t_1 < t_{1.5} < t_2)$, $(t_2 < t_{2.5} < t_3)$ and $(t_3 < t_{3.5} < t_d)$. Such a result is achieved by arranging intervals so that $(t_1 - t_2) > (t_2 - t_3) > (t_3 - t_d)$. The increase in average slope can also be attained by providing different chambers with particles having different burn rates; burn rate is varied by changing particle size and surface area, which implies changing the diameter of the generally spherical particles.

While there have been described and illustrated several specific embodiments of the invention, it will be clear that variations in the details of the embodiments specifically illustrated and described may be made without departing from the true spirit and scope of the invention as defined in the appended claims.

We claim:

1. A pulsed pressure source comprising plural chambers holding progressively larger masses of gas generants, said chambers being arranged so that each has an outlet coupled in fluid flow relation with the chamber having the next largest gas generant mass, the gas generant in each chamber being predominantly a non-explosive solid particulate material, the smallest chamber including a metal element in contact with the generant therein and selectively connected to an electric source, the electric source supplying a pulse having sufficient energy and duration when coupled to the element to cause the metal element to rupture and form a plasma discharge in the generant in the smallest chamber, the plasma discharge having sufficient energy and pressure to energize the generant in the smallest chamber to a plasma in response to the surface of the particles being heated by the plasma from the metal flowing between the particles, the chambers and generants being arranged so that gas from each chamber sequentially flows into the chamber having the next largest gas generant mass to sequentially heat the generant mass in the next largest chamber into a gas.

2. The pulsed pressure source of claim 1 wherein the chambers, masses in the chambers and the flow paths between the chambers are arranged so that gas flow from chamber C1 into chamber C2 continues until after gas flow from chamber C2 to chamber C3 is initiated, where C1, C2 and C3 are chambers having progressively larger generant masses therein.

3. The pulsed pressure source of claim 2 wherein the chambers, masses in the chambers and the flow paths between the chambers are arranged so that the pressure and temperature of the generant in chamber $C_i$ are approximately constant while the generant in chamber $C_i$ is being consumed by the gas from chamber $C_i$, where $C_i$ is selectively each of the chambers.

4. The pulsed pressure source of claim 3 wherein the chambers, masses in the chambers and the flow paths between the chambers are arranged so that the mass flow rate of the gas from chamber $C_i$ to chamber $C_{i+1}$ is approximately equal to the consumption rate of the generant in chamber $C_i$, where $C_{i+1}$ is the chamber in downstream fluid flow relation with chamber $C_i$.

5. The pulsed pressure source of claim 4 wherein chamber $C_i$ has a volume sufficiently small that there is virtually no fluid flow from chamber $C_{i+1}$ to chamber $C_i$.

6. The pulsed pressure source of claim 4 wherein chamber C1 is constructed to confine the flow of gas from the generant in chamber C1 from chamber C1 only into chamber C2 and chamber C2 is constructed to confine the flow of gas from the generant in chamber C2 only into chamber C3.

7. The pulsed pressure source of claim 6 further including a first diaphragm for the gas flow from chamber C1 to chamber C2, the first diaphragm rupturing in response to the pressure in chamber C1 reaching a predetermined level, a second diaphragm in the gas flow path from chamber C2 to chamber C3, the second diaphragm rupturing in response to the pressure in chamber C2 reaching a predetermined level, a third diaphragm in a gas flow path from chamber C3, the third diaphragm rupturing in response to the pressure in chamber C3 reaching a predetermined level.

8. The pulsed pressure source of claim 7 wherein the first, second and third diaphragms respectively include vent holes that change from a closed state to an open state in response to the pressures in chambers C1, C2 and C3 reaching pressures lower than the pressures which respectively rupture the first, second and third diaphragms, the vent holes enabling the pressures in the chambers to continue to increase until rupture of the associated diaphragms.

9. The pulsed pressure source of claim 2 wherein chamber C1 is constructed to confine the flow of gas from the generant in chamber C1 from chamber C1 only into chamber C2 and chamber C2 is constructed to confine the flow of gas from the generant in chamber C2 only into chamber C3.

10. The pulsed pressure source of claim 9 further including a first diaphragm for the gas flow from chamber C1 to chamber C2, the first diaphragm rupturing in response to the pressure in chamber C1 reaching a predetermined level, a second diaphragm in the gas flow path from chamber C2 to chamber C3, the second diaphragm rupturing in response to the pressure in chamber C2 reaching a predetermined level, a third diaphragm in a gas flow path from chamber C3, the third diaphragm rupturing in response to the pressure in chamber C3 reaching a predetermined level.

11. The pulsed pressure source of claim 10 wherein the first, second and third diaphragms respectively include vent holes that change from a closed state to an open state in response to the pressures in chambers C1, C2 and C3 reaching pressures lower than the pressures which respectively rupture the first, second and third diaphragms, the vent holes enabling the pressures in the chambers to continue to increase until rupture of the associated diaphragms.

12. The pulsed pressure source of claim 1 wherein the non-explosive material includes $NH_4NO_3$ particles.

13. The pulsed pressure source of claim 1 wherein the $NH_4NO_3$ particles are coated with carbon powder.

14. The pulsed pressure source of claim 13 wherein the particles are about 200 micrometers in diameter and the carbon powder has a diameter of about 5 micrometers.

15. The pulsed pressure source of claim 12 further including a hermetic seal around the $NH_4NO_3$ particles.

16. The pulsed pressure source of claim 1 wherein the electric source includes a capacitor connected to be charged by a DC power supply, the capacitor being connected in a discharge circuit including said metal element in series with an inductor.

17. The pulsed pressure source of claim 16 wherein the electric pulse has a duration less than an order of magnitude of the duration required for the generant in the chamber having the smallest generant mass to be consumed by the plasma formed therein.

18. The pulsed pressure source of claim 17 where a maximum of 25 joules is coupled by the pulse to the metal element.

19. The pulsed pressure source of claim 18 wherein the metal element has a segment with a smaller cross-sectional area than the remainder thereof, the smaller cross-sectional area segment initially vaporizing to form the plasma in response to the pulse being supplied to it.

20. The pulsed pressure source of claim 17 wherein the metal element has a segment with a smaller cross-sectional area than the remainder thereof, the smaller cross-sectional area segment initially vaporizing to form the plasma in response to the pulse being supplied to it.

21. The pulsed pressure source of claim 1 wherein the metal element has a segment with a smaller cross-sectional area than the remainder thereof, the smaller cross-sectional area segment initially vaporizing to form the plasma in response to the pulse being supplied to it.

22. The pulsed pressure source of claim 1 wherein a plurality of said pulsed pressure sources are provided, means for sequentially activating the plural pulsed pressure sources in response to a common sensed parameter so that a gas pressure pulse from each of said pulsed pressure sources flows continuously to a load over an interval beginning with flow from the chamber having the largest generant mass of the first source which is activated and ending with flow from the chamber having the largest generant mass of the last source which is activated.

23. The pulsed pressure source of claim 22 wherein the separate pressure pulses overlap in time so that the first pressure pulse has a duration beginning with flow from the chamber having the largest generant mass of the first pressure source which is activated and ending with flow from the chamber having the largest generant mass of the last pressure source which is activated, the second pulse having a duration beginning with flow from the chamber having the largest generant mass of the second pressure source which is activated and ending with flow from the chamber having the largest generant mass of the last pressure source which is activated, the third pulse having a duration beginning with flow from the chamber having the largest generant mass of the third pressure source which is activated and ending with flow from the chamber having the largest generant mass of the last pressure source which is activated.

24. The pulsed pressure source of claim 1 wherein each chamber includes means for partially confining the vapor formed therein to cause the vapor to be resident in the chamber for a sufficient length of time to cause heating of a substantial amount of the generant in the chamber to a vapor.

25. The pulsed pressure source of claim 24 wherein the means for partially confining the vapor includes a frangible diaphragm with vent holes.

26. The pulsed pressure source of claim 1 further including an exit orifice to a load for gas flowing from the chamber having the largest mass, the smallest chamber being constructed so gas flowing from it can flow to the load only through an exit in another of the chambers, the exit orifice being closed by a diaphragm that ruptures only in response to the generant in the chamber having the largest mass being converted in to a gas having a predetermined pressure.

27. An occupant passive restraint system for an automotive vehicle having a battery comprising an air bag, means for sensing deceleration of the vehicle associated with a crash, a pulsed pressure source in fluid flow relation with the air bag, the pulsed pressure source including: plural chambers holding progressively larger masses of gas generates, said chambers being arranged so that each has an outlet coupled in fluid flow relation with the chamber having the next largest gas generant mass, the gas generant mass in each chamber being predominantly a non-explosive solid material, the smallest chamber including a metal element in contact with the generant therein and selectively connected to an electric source energized by said battery, the electric source responding to the deceleration sensing means for supplying a pulse having sufficient energy and duration to the element to cause the metal element to burst and form a plasma discharge having sufficient energy and pressure to the plasma discharge having sufficient energy and pressure to energize the generant in the smallest chamber to a vapor, the chambers and generants being arranged so that gas from each chamber sequentially flows into the chamber having the next largest gas generant mass to sequentially activate the generant mass in the next largest chamber, the gas from the chamber having the largest generant mass flowing into the air bag.

28. The occupant passive restraint system of claim 27 wherein a plurality of said pressure sources are provided, means for sequentially activating the plural pressure sources in response to a crash being sensed so that a gas pressure pulse from each of said pressure sources flows continuously to the bag over an interval beginning with flow from the chamber having the largest generant mass of the first pressure source which is activated and ending with flow from the chamber having the largest generant mass of the last pressure source which is activated.

29. The occupant passive restraint system of claim 28 the separate pulses overlap in time so that the first pulse has a duration beginning with flow from the chamber having the largest generant mass of the first pressure source which is activated and ending with flow from the chamber having the largest generant mass of the last pressure source which is activated, the second pulse having a duration beginning with flow from the chamber having the largest generant mass of the second pressure source which is activated and ending with flow from the chamber having the largest generant mass of the last pressure source which is activated, the third pulse having a duration beginning with flow from the chamber having the largest generant mass of the third pressure source which is activated and ending with flow from the chamber having the largest generant mass of the last pressure source which is activated.

30. The occupant passive restraint system of claim 29 including temperature sensing means for controlling energization of said pressure pulses.

31. The occupant passive restraint system of claim 30 wherein the temperature sensing means controls when said pressure pulses are derived.

32. The occupant passive restraint system of claim 30 wherein the temperature sensing means controls how many of said pressure pulses are derived.

33. The occupant passive restraint system of claim 27 wherein each chamber includes means for partially confining the vapor formed therein to cause the vapor to be resident in the chamber for a sufficient length of time to cause heating of a substantial amount of the generant in the chamber to a vapor.

34. The occupant passive restraint system of claim 33 wherein the means for partially confining the vapor includes a frangible diaphragm with vent holes.

35. The occupant passive restraint system of claim 27 further including an exit orifice to the air bag for gas flowing from the chamber having the largest mass, the exit orifice being closed by a diaphragm that ruptures only in response to the generant in the chamber having the largest mass being converted into a gas having a predetermined pressure, for gas flowing from the chamber having the largest mass, the smallest chamber being constructed so gas flowing from it can flow to the load only through an exit in another of the chambers, the exit orifice being closed by a diaphragm that ruptures only in response to the generant in the chamber having the largest mass being converted into a gas having a predetermined pressure.

36. The occupant passive restraint system of claim 27 wherein the chambers, asses in the chambers and the flow paths between the chambers are arranged so that gas flow from chamber C1 into chamber C2 continues until after gas flow from chamber C2 to chamber C3 is initiated, where C1, C2 and C3 are chambers having progressively larger generant masses therein.

37. The occupant passive restraint system of claim 36 wherein the chambers, masses in the chambers and the flow paths between the chambers are arranged so that the pressure and temperature of the generant in chamber $C_i$ are approximately constant while the generant in chamber $C_i$ is being consumed by the gas from chamber $C_i$, where $C_i$ is selectively each of the chambers.

38. The occupant passive restraint system of claim 37 wherein the chambers, masses in the chambers and the flow paths between the chambers are arranged so that the mass flow rate of the gas from chamber $C_i$ to chamber $C_{i+1}$ is approximately equal to the consumption rate of the generant in chamber $C_i$, where $C_{i+1}$ is the chamber in downstream fluid flow relation with chamber $C_i$.

39. The occupant passive restraint system of claim 38 wherein chamber C1 is constructed to confine the flow of gas from the generant in chamber C1 from chamber C1 only into chamber C2 and chamber C2 is constructed to confine the flow of gas from the generant in chamber C2 only into chamber C3.

40. The occupant passive restraint system of claim 39 further including a first diaphragm for the gas flow from chamber C1 to chamber C2, the first diaphragm rupturing in response to the pressure in chamber C1 reaching a predetermined level, a second diaphragm in the gas flow path from chamber C2 to chamber C3, the second diaphragm rupturing in response to the pressure in chamber C2 reaching a predetermined level, a third diaphragm in a gas flow path from chamber C3, the third diaphragm rupturing in response to the pressure in chamber C3 reaching a predetermined level.

41. The occupant passive restraint system of claim 40 wherein the first, second and third diaphragms respectively include vent holes that change from a closed state to an open state in response to the pressures in chambers C1, C2 and C3 reaching pressures lower than the pressures which respectively rupture the first, second and third diaphragms, the vent holes enabling the pressures in the chambers to continue to increase until rupture of the associated diaphragms.

42. An occupant passive restraint system for an automotive vehicle having a battery comprising an air bag, means for sensing deceleration of the vehicle associated with a crash, a pulsed pressure source in fluid flow relation with the air bag, the pulsed pressure source including: means for generating separate pressure pulses at sequential time intervals in response to the deceleration means sensing a single impact of a crash, pressures from the sequentially generated pulses being combined to produce a flow for inflating the air bag, means for generating the separate pressure pulses including plural sources of pressure pulses, said sources being responsive to the crash sensing means to be sequentially activated, each of said sources of pressure pulses including plural chambers holding progressively larger masses of gas generants, said chambers being arranged so that each has an outlet coupled in fluid flow relation with the chamber having the next largest gas generant mass, the gas generant mass in each chamber being predominantly a non-explosive solid material, the smallest chamber including a metal element in contact with the generant therein and selectively connected to an electric source energized by said battery, the electric source responding to the deceleration sensing means for supplying a pulse having sufficient energy and duration to the element to cause the metal element to rupture and form a plasma discharge in the generant in the smallest chamber, the plasma discharge having sufficient energy and pressure to energize the generant in the smallest chamber to a vapor, the chambers and generants being arranged so that gas from each chamber sequentially flows into the chamber having the next largest gas generant mass to sequentially activate the generant mass in the next largest chamber, the gas from the chamber having the largest generant mass flowing into the air bag.

43. The occupant passive restraint system of claim 42 wherein the separate pulses overlap in time so that the first pulse has a duration beginning with flow from the chamber having the largest generant mass of the first pressure source which is activated and ending with flow from the chamber having the largest generant mass of the last pressure source which is activated, the second pulse having a duration beginning with flow from the chamber having the largest generant mass of the second pressure source which is activated and ending with flow from the chamber having the largest generant mass of the last pressure source which is activated, the third pulse having a duration beginning with flow from the chamber having the largest generant mass of the third pressure source which is activated and ending with flow from the chamber having the largest generant mass of the last pressure source which is activated.

44. The occupant passive restraint system of claim 43 wherein each chamber includes means for partially confining the vapor formed therein to cause the vapor to be resident in the chamber for a sufficient length of time to cause heating of a substantial amount of the generant in the chamber to a vapor.

45. The occupant passive restraint system of claim 44 wherein the means for partially confining the vapor includes a frangible diaphragm with vent holes.

* * * * *